United States Patent [19]
Reilly

[11] 3,736,091
[45] May 29, 1973

[54] APPARATUS FOR FINISHING HOLLOW BLOW MOLDED ARTICLES

[75] Inventor: Joseph R. Reilly, Naugatuck, Conn.

[73] Assignee: Monsanto Company, Saint Louis, Mo.

[22] Filed: Mar. 3, 1971

[21] Appl. No.: 120,514

[52] U.S. Cl............425/326, 425/297, 425/DIG. 806
[51] Int. Cl. ..............................................B29d 23/03
[58] Field of Search......................425/326, 387, 342, 425/297, 302, 305, DIG. 806

[56] References Cited

UNITED STATES PATENTS

| | | | |
|---|---|---|---|
| 2,988,776 | 6/1961 | Schaich | 425/326 X |
| 2,994,103 | 8/1961 | Schaich | 425/326 X |
| 3,466,702 | 9/1969 | Stenger | 425/326 X |
| 2,890,483 | 6/1959 | Soubier | 425/297 |
| 2,943,349 | 7/1960 | Adams et al. | 425/326 X |
| 3,025,562 | 3/1962 | Nelson | 425/326 X |
| 3,084,383 | 4/1963 | Figna | 425/326 X |
| 3,363,282 | 1/1968 | Hagen | 425/387 X |
| 3,198,861 | 8/1965 | Marvel | 425/326 |

Primary Examiner—J. Spencer Overholser
Assistant Examiner—Michael O. Sutton
Attorney—James C. Logomasini, Michael J. Murphy and Neal E. Willis

[57] ABSTRACT

A method and apparatus for finishing a blow molded plastic article having flash attached to a neck portion thereof which includes gripping and relatively moving the flash and the article away from each other to sever the flash at a portion immediately adjacent the end of the neck which is at an elevated temperature with respect to the neck portion, and thereafter advancing a forming mandrel into the neck to roll an irregular edge left in the area of flash severance forwardly toward the body of the article and outwardly against the wall of the neck to form a smooth finish. The apparatus includes an inwardly directed step in the blow mold at the extremity of the neck defining portion of the mold whereat a thickened and therefore elevated temperature portion of the plastic is formed on expanding the parison, this thickened section being the area where severing occurs during finishing.

6 Claims, 8 Drawing Figures

PATENTED MAY 29 1973

INVENTOR
JOSEPH R. REILLY

BY Michael J. Murphy
ATTORNEY

INVENTOR
JOSEPH R. REILLY
BY Michael J. Murphy
ATTORNEY

3,736,091

APPARATUS FOR FINISHING HOLLOW BLOW MOLDED ARTICLES

BACKGROUND OF THE INVENTION

This invention relates to the finishing of blown hollow articles and more particularly to forming smooth neck finishes on such articles either inside or outside of the forming mold.

When hollow articles having neck portions at one end are formed by expanding a heat softened tubular parison within a blow mold, an appendage known as waste flash may be left attached to the neck portion as a result of the molding operation, which must be removed before the article can be considered ready for use. In the past, this has been done by machinery downstream of the molding station incorporating a saw for cutting off the flash just above or at the end of the neck and a high speed reaming tool for drilling away the remaining flash to finish the neck surface sufficiently smoothly as to provide an aesthetically appealing end on the article and/or to permit flush fitting of a closure thereon when the article, for example, is a bottle. Such finishing is also necessary to eliminate any sharp surfaces on the inner surface of the neck when the article is a bottle out of which the contents might be consumed directly by a user. Needless to say, in high throughput, continuously operating molding lines, such tooling becomes dull rather frequently, necessitating equipment downtime for tooling replacement and requiring labor for resharpening. The situation is aggravated when the workpiece is formed from a plastic which is relatively hard and brittle, such as those formed from high nitrile group containing materials wherein the plastic comprises at least 60 weight percent of a polymer formed from a nitrile group containing monomer. Also, special handling of the article may be required between the mold and the trimming machinery to permit finishing in an upside down position to insure that plastic particles, e.g. in the form of chips, do not end up in the body of the article. This latter situation is especially critical when the article is a container in the form of a bottle for holding a consumable product.

Alternative approaches for finishing the neck portion of a blown hollow article have involved manipulating the end of the heat softened parison from which the article is formed while it is disposed within the cavity of the blow mold, and generally either before or during expansion to form the article. Techniques for accomplishing this are disclosed in a number of issued U.S. patents e.g. U.S. Pat. Nos. 3,272,896; 3,303,249 and 3,410,937. Such systems, however, suffer the common deficiency of relying for parison support on an inwardly extending projection in the neck area of the mold, which is meant to close upon and frictionally engage the outer surface of the parison as the mold sections come together. This has been found difficult to consistently accomplish, realizing that the outside diameter of the parison is purposely being kept less than that of the diameter of the mold neck portion, since this is essential in order to avoid generating more flash along the mold parting line as the sections close on the parison. Thus, the parison frequently is not fully engaged by such a projection and often slips into the body of the mold cavity under the influence of gravity, or is pushed thereinto by the action of the neck finishing mandrel advancing into the open ended parison. In addition, since these techniques depend on maintaining an open end on the portion of the parison defining the article neck, they of course are not applicable to blow molding systems wherein both ends of the parison are pinched shut on closing the mold sections, and the thus enclosed parison then expanded via fluid issuing through a hollow needle which has pierced the parison wall.

SUMMARY OF THE INVENTION

Now, however, there has been developed a novel and highly versatile technique for finishing the neck portion of a blown hollow article which overcomes the previously noted deficiencies of the prior art.

Accordingly, it is a principal object of this invention to provide an improved method and apparatus for finishing blown hollow articles having waste flash attached to neck portions thereof.

Another object of this invention is to provide such a method which provides for firmly supporting the parison in the neck flash or moil area during blowing, thus avoiding undesirable sagging of one end of the parison into the mold during neck forming.

Yet another object of this invention is to provide such a method which is especially applicable to blow molding systems utilizing a hollow needle to expand the parison, wherein both ends of the parison are pinched shut during mold closing.

An additional object is to provide such a method wherein the outer surface of the neck is dimensionally precisely formed by blowing at the same time the remainder of the article is blown.

A further object of this invention is to provide such a method which is equally applicable toward forming an article in a right side up, upside down or any intermediate position.

An additional object of this invention is to provide means for carrying out the above objects which do not require relatively complicated high speed rotary machinery.

Other objects of this invention will in part be obvious and will in part appear hereinafter.

These and other objects are accomplished in a method of finishing a blown hollow plastic article having waste flash attached to a neck portion which comprises establishing a difference in temperature between the neck portion and the flash in the area immediately adjacent said neck portion, the temperature of the neck portion being sufficiently low as to resist substantial deformation on application of a force thereto, the temperature of the immediately adjacent flash portion being in excess of that of the neck portion but below that at which the plastic is incapable of sustaining its form, gripping the waste flash, relatively moving the gripped waste flash and the article away from each other to sever the flash from the neck in the area of attachment of the flash to the neck leaving an irregular lip extending around the opening at the outer end of the neck, and then advancing a forming mandrel into said opening to roll the lip forwardly toward the body of the article and outwardly against the wall of the blown neck to form a smooth neck finish on the article.

Severing of the flash is carried out after the neck portion of the article has been blown, either while still confined within the forming mold or while separately supported, preferably around the neck, downstream of the blow mold. The parison is well supported prior to expansion by substantial frictional engagement with surfaces of the neck flash holding section during mold closing.

The apparatus includes an inwardly directed step in the blow mold at the end of the neck defining portion, and means for gripping the flash which preferably comprise a pair of opposing jaws which in closed position form a chamber substantially conforming in surface contour to that of the neck flash, each of the jaws having a groove formed in its surface for accepting a portion of the neck flash on closing thereon.

BRIEF DESCRIPTION OF THE DRAWINGS

In describing the overall invention, reference will be made to the accompanying drawings wherein.

DETAILED DESCRIPTION OF THE ILLUSTRATED EMBODIMENTS

Figure 1:
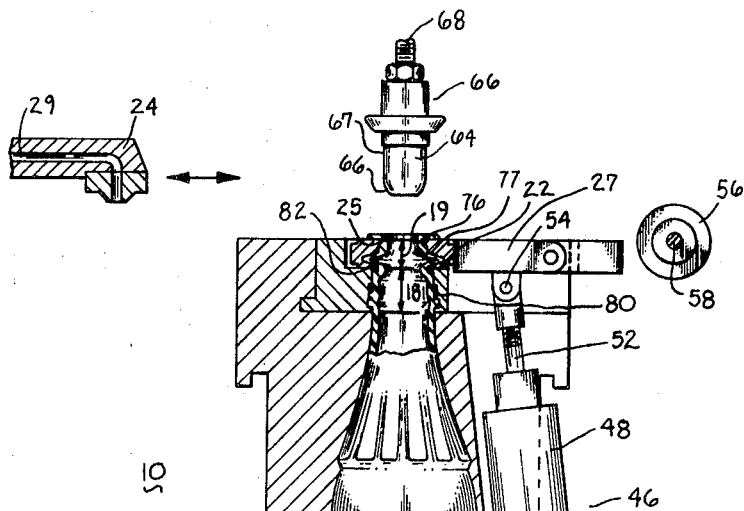
FIG. 1 is a partially schematic, sectional, elevational view taken along the line 1—1 of FIG. 3 illustrating apparatus components of the invention after formation of an article having waste flash attached to the neck portion thereof.
Figure 2:
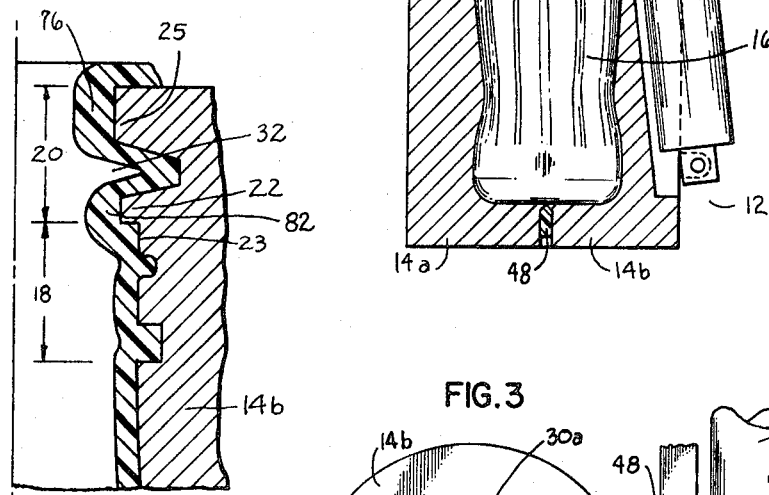
FIG. 2 is an enlarged partial, schematic, elevational view of a portion of the apparatus depicted in FIG. 1 in slightly modified form.

Referring now to the drawings, there is illustrated in FIG. 1, apparatus generally designated 10 for forming a hollow thermoplastic article such as a bottle, having a finished neck. Apparatus 10 comprises blow mold means which includes a blow mold 12 having partible sections 14a and 14b which in the closed position form a cavity 16, the periphery of which conforms to the shape of the bottle. Cavity 16 includes a neck defining portion 18 and, as illustrated in FIG. 2, may include a neck flash holding cavity 20 adjacent neck defining portion 18. In FIG. 1, neck flash holding cavity 19 is alternatively illustrated as being within the neck flash gripping means to be described hereafter in more detail. Supporting ledge 25 projects inwardly at the upper end of neck flash holding section 19 or 20 (FIGS. 1 and 2) a distance greater than that of step 22.

Means, typically illustrated as blow head 24 in FIG. 1, are provided for expanding a heat softened thermoplastic parison outwardly against the surfaces of article shape defining cavity 16 to form the article. Blow head 24 (FIG. 1) is adapted to move over the open end of the enclosed parison after its disposition within mold 12 and has a passage 29 extending therethrough which is connected at one end to a suitable source of pressurized fluid, not shown.

Figure 3:
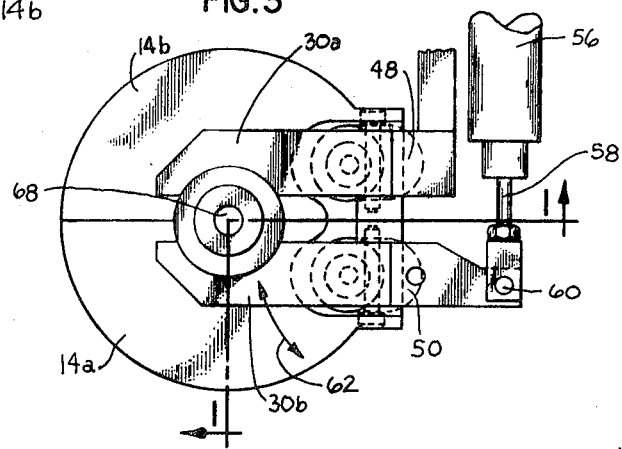
FIG. 3 is a plan view of the apparatus of FIG. 1.
Figure 4:
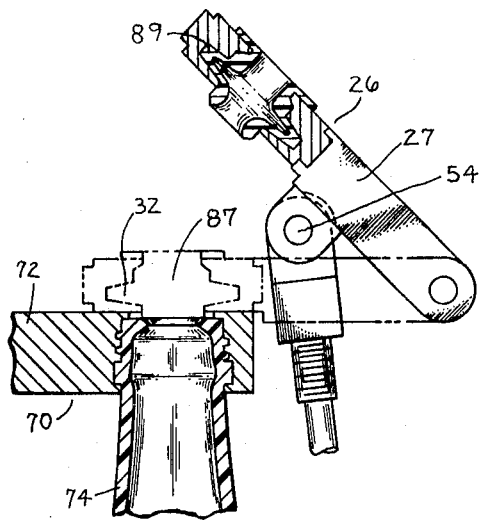
FIG. 4 is a sectional, elevational view illustrating the flash removal step of the present invention.
Figure 7:
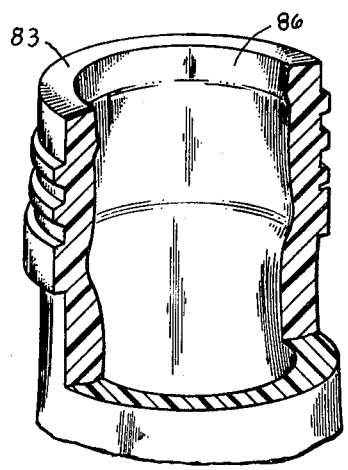
FIG. 7 is a view similar to FIG. 5 illustrating the end of the article after the step of FIG. 6.

Means (FIGS. 1, 3 and 4) generally indicated as 26 are provided for gripping the neck flash. In the embodiment of FIGS. 1, 3 and 4, these means include a pair of opposing jaw portions 30a and 30b (FIG. 3) which in closed position form the neck flash holding cavity of the assembly. In the embodiment of FIGS. 2 and 7, the neck flash holding section is an integral part of the blow mold, separate means being necessary with such an apparatus arrangement downstream of the blow mold for gripping the neck flash, such as those illustrated in FIGS. 1 and 4 as 26. Each of jaws 30a and 30b has an outwardly extending recess, preferably in the form of a circular groove, typically illustrated as 32 in FIG. 4, formed in its surface for accepting a portion of the neck flash on closing thereon. Arm portions 27 connect at one end to jaws 30 and at the other end to means 46 for displacing gripping means 26 with respect to the article neck to sever the neck flash from the article at step 22 in a manner to be hereafter described in more detail. These means 46 may include fluid actuated pistons within cylinders 48 and 50 which have rods 52 pivotally connected at 54 to arm portions 27 of gripping means 26. Such pistons function to move jaws 30a and 30b upwardly and outwardly in an arcuate path as generally illustrated in FIG. 4 during neck flash removal. Cylinder 56 enclosing a piston attached to rod 58 which in turn is pivotally connected at 60 to the arm portion 27 associated with jaw 30b serves to move the latter in a horizontal plane inwardly and outwardly toward and away from the mold parting line in the direction of arrow 62 so as to enclose one half of the neck flash portion prior to upward reciprocation of the jaws. Though duplicate cylinders may be used for such horizontal movement of jaws 30, as illustrated in the embodiment of FIGS. 1 and 3, only one may be necessary if mold opening and closing is accomplished by moving half 14b toward and away from half 14a while holding half 14a having horizontally immovable jaw 30a thereon stationary. Each of cylinders 48, 50 and 56 are connected through suitable conventional conduits, valving and control instrumentation well known to those skilled in the art to one or more sources of pressurized fluid for actuating the pistons within the cylinders at the desired points in the process.

Also included as part of apparatus 10 is a circular forming mandrel 64 which is smoothly contoured without surface projections and inwardly tapered along its leading end 66 for entry into the neck of the article after removal of the neck portion in a manner to be shortly described in more detail. Mandrel 64 is connected to reciprocating means 66 for moving it into and out of the neck of the article. Suitable conventional actuating means, for example a fluid operated piston within a cylinder, may be provided as part of these means 66 and connected to rod 68. Heating means such as one or more electrically operated cartridge type resistance heaters, (not shown) may be incorporated into mandrel 64 if found necessary.

Figure 8:
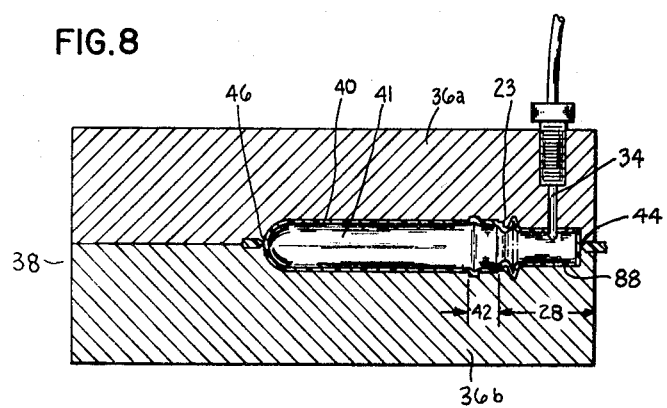
FIG. 8 is a sectional elevational view of an important alternative embodiment of the present invention.

As illustrated in FIG. 4, gripping means 26, as well as a forming mandrel of the type depicted at 64 in FIG. 1, may be located downstream of blow mold 12 and necessarily must be so located with the alternative embodiment of FIG. 8. Under such circumstances, means 70 which may include another pair of jaws, typically illustrated at 72, must be provided for supporting the article 74. These means preferably engage the article around the outside surface of the neck, as shown so as to grip the threads and support the neck to prevent the formed neck from being distorted, deformed or otherwise adversely affected by the pulling force during the flash removal operation.

In the embodiment of FIG. 8, the means for expanding the parison includes a hollow needle 34 situated in a bore in one of the mold sections 36 having one end opening into the neck flash holding section 28 of mold 38. As also illustrated in this embodiment, the article being expanded in the blow mold may be a cylindrical preform 40 for use as the workpiece in a separate downstream forming process independent from that occuring in mold 38. In such a case, the shape of the cavity within mold 38 defining the article includes a cylindrical portion 41 wherein the diameter when the sections are closed on each other is substantially equivalent to that of the neck defining portion 24 of the cavity. Each mold half 36a and 36b in FIG. 8 has opposing compression edges 44 and 46 at either end thereof for sealing each end of the parison shut on closing sections 36 on each other.

Figure 5:
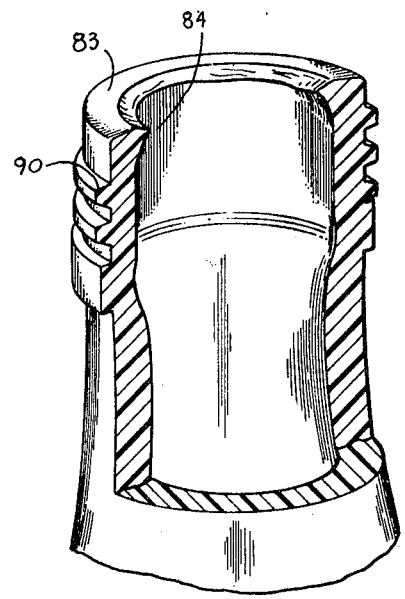
FIG. 5 is an enlarged perspective view of the end of the article of FIG. 1 after the step illustrated in FIG. 4.

In operation, a thermoplastic parison in heat softened condition is extruded in a conventional manner through an annular orifice in an extruder head. The size of the orifice or the conditions of extrusion are controlled such that the maximum diameter of the unexpanded parison is less than that of any of the various cavity portions of the mold with the exception of supporting ledge 25 in FIGS. 1 and 2. This is necessary to avoid generating flash along the parting line of the mold sections as they close on each other, and which thereafter would necessarily have to be removed. The length of the parison is in excess of that necessary to form the desired article, the surface of the latter being defined by that of cavity 16 of blow mold 12. Mold sections 14a and 14b are then brought together to enclose and dispose the extruded parison within the article defining sections of the mold. In so doing, an end section 76 of the flash defining end portion thereof is firmly frictionally engaged outside the portion of the parison defining the article, by ledge 25 of either the mold sections (FIG. 2) or the gripping jaws (FIG. 1), since the diameter of the opening at ledge portion 25 is less than that of the outside diameter of the parison. The parison is therefore firmly supported within the mold sections at the portion thereof adjacent that which will form the neck of the article. The other end in FIG. 1 is sealed shut as a result of the closing movement of the mold sections so as to form tail 48 in a conventional manner and which may be snapped off relatively easily after the article is formed. Blow head 24 is then moved over the open end of the thus enclosed parison and pressurized fluid admitted through passage 29 into the parison to expand it outwardly against the article defining mold surfaces, thus forming neck 80 by blowing, as well as the associated body portion of the hollow article. As illustrated in FIGS. 5 and 7, the outer surfaces of the necks of consecutively shaped articles including top face 83 will always be accurately formed to the exact same dimensions as that defined by the opposing fixed mold surfaces, since formation is by blowing outwardly against such surfaces. Alternatively, mandrel 64 may have a passage (not shown) formed therein which is associated with a source of pressurized fluid, and which may be used to expand the parison on reciprocation downwardly without requiring a separate blowhead. Since step 22 prevents the portion of the parison directly opposite it from expanding outwardly to any great extent, a thickened section 82 will be present in the plastic in the area of the junction of the flash with the upper end of the neck after the parison has been expanded. Because the diameters of the molding surfaces on either side of step 22 are greater than that at step 22, the parison wall thickness on either side of this step accordingly will also be less than portion 82, as illustrated in enlarged detail in FIG. 2. After expansion, the plastic is allowed to remain for a short time in contact with the opposing molding surfaces, which in turn are kept at a reduced temperature, for example by circulating a conventional cooling medium through channels (not shown) just below the molding surfaces. This time must be sufficient to reduce the temperature of the neck portion sufficiently low as to resist substantial deformation on application of a force thereto. The temperature of flash portion 82 opposite step 22, or in other words that portion of the flash immediately adjacent the end of the article neck, will also have cooled somewhat from its temperature prior to expansion, in view of the cooling influence of the expanding fluid and the contact of its outer surface with that of step 22. However, for the periods of mold surface contact time under consideration, for example on the order of from 3 to 10 seconds, this minimum time being preferred to avoid uneconomical prolongation of the molding cycle, the temperature of flash portion 82 will be in excess of that of neck portion 80 because of its greater thickness, but nevertheless below that at which the thermoplastic is incapable of sustaining its molded form. Also, the temperature of the flash in contact with the surfaces of groove 32 adjacent step 22 will be incrementally less than that of portion 82 after the plastic has been in contact with such surfaces for said period of time, in view of the reduced wall thickness caused by thinning during expansion. When utilizing a step 22 projecting inwardly a distance of from 0.05 to 0.125 inch from surface 23 toward the axis of cavity 16, the temperature of thickened section 82 for most thermoplastic materials will be between 25° to 100°F. greater than that of neck portion 80 of the article. This temperature difference wherein that of the portion of the flash immediately adjacent the neck where severance is to occur is greater than that of the adjacent neck is important. This is so because if the temperature of this immediately adjacent neck flash portion is reduced essentially to that of the neck, or in other words to that at which the plastic will not substantially deform when stressed, the surface in the area of severance after removal of the flash will be extremely jagged, and will not deform in the desired manner under the influence of the subsequently entering forming mandrel. On the other hand, if the temperature of the neck is the same as that of the hot immediately adjacent flash portion, the blown neck finish will undesirably deform and distort substantially when the adjoining flash is pulled away. Though this temperature differential is illustrated in the preferred embodiment as being established during the molding operation, it is within the purview of the invention to provide for reheating the flash in the area adjoining the neck in those situations where the article and adjoining neck flash have been allowed to cool sufficiently as to set the plastic completely.

After the temperatures of the various sections of the end of the parison have reached the just described desired levels, and while the expanded parison is still confined within mold 12, flash portion 77 is moved away from neck portion 80 to tear flash portion 77 away from neck 80 at thickened section 82, thereby leaving an irregular lip illustrated at 84 in FIG. 5 extending around the inner surface of neck portion 80, in the area of prior severance. Such relative movement is accomplished in the illustrated embodiment of FIGS. 1, 3 and 4 by energizing the pistons within cylinders 48 and 50 so as to reciprocate jaws 30a and 30b upwardly away from mold enclosed neck portion 80, thereby tearing flash section 77 away about step or edge 22.

Figure 6:
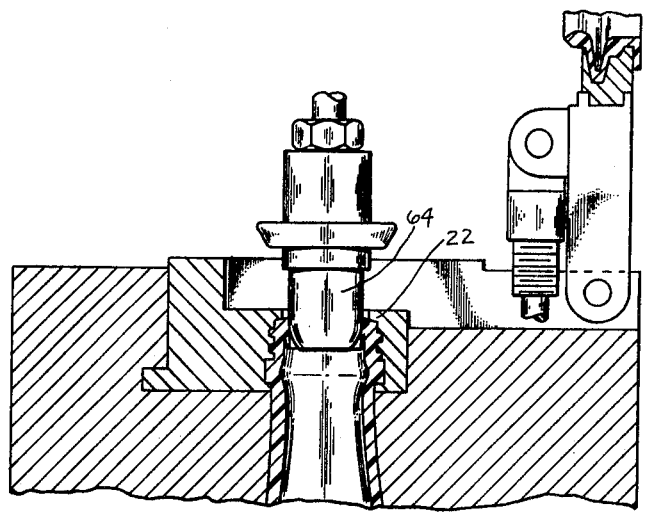
FIG. 6 is an elevational sectional view showing a subsequent step in the process of the present invention.

Thereafter, while the temperature of the material now defining irregular lip 84 is still sufficiently high to permit deformation of the plastic, tapered mandrel 64 is caused to advance into the open end of the article neck to initially displace or roll lip 84 downwardly as a result of its contact with the smooth tapered end 64 of the mandrel, and then outwardly against the inner wall of the previously blown neck as a result of contact of the downwardly rolled lip with the increased diameter portion of mandrel 64 as the latter proceeds further into the neck, thereby finishing the upper end of the neck portion of the article smoothly as illustrated at 86 is FIG. 7. To accomplish this finishing function, as indicated in FIG. 6, the maximum diameter of mandrel 64 should be slightly less than the diameter of step 22 by an amount on the order of the thickness of that portion 82 of the parison opposite step 22 after expansion. Mandrel 64 is then reciprocated upwardly out of the neck portion of the article, sections 14a and 14b are caused to separate, and the piston 58 within cylinder 56 is caused to move rearwardly so as to draw jaw 30b away from jaw 30a, thereby allowing the article with the finished upper end to fall away from the blow mold. A subsequently extruded parison formation is then disposed between the mold halves and section 14b and jaw 30b caused to move toward section 14a and jaw 30a respectively so as to enclose the next parison for commencement of a subsequent cycle.

The embodiment of the invention of FIGS. 2 and 4 illustrates the neck finishing concept of the invention as occuring downstream of mold 12 or in other words after the blown article with attached flash has been removed from the mold. In such instances, the flash holding cavity is formed as an integral part of mold 12 as illustrated in FIG. 2, and the gripping means, otherwise similar to that of FIG. 1, are positioned so as to close around the outer surface of the flash after ejection from the mold as illustrated in FIG. 4. Prior to reciprocating the gripping means, the article is held in a fixed position, preferably by means 70 frictionally engaging the formed outer neck surface. The forming mandrel 64 is thereafter advanced into the open end of the article neck in the previously described manner. In this embodiment, the cavity 87 within gripping means 26 may be designed to be slightly smaller in size than that defined by the flash being removed in order that the jaws actually squeeze and compress the plastic when closed on the flash. Also, blown flash projection 89 serves to enhance the gripping action when the cooperating jaws are closed around the flash.

In the embodiment of FIG. 8, flash portion 88 is pierced with hollow needle 34 after disposition of the parison within mold sections 36a and 36b and pressurized fluid then introduced through the hollow needle into the parison to expand it into the shape of cylindrical preform 40, or to any other desired article shape. In this embodiment, since both ends of the parison are pinched shut between compression edges 44 and 46 of mold sections 36a and 36b during mold closing, it obviously is necessary to tear the flash away from the neck downstream of the blow mold, as illustrated in FIG. 4.

Otherwise the process is the same as that just described.

The versatile process of the present invention is applicable to systems where extrusion is either in the upward, downward or any intermediate direction. It is likewise applicable in right side up forming of the article as well as upside down forming, i.e. wherein the neck portion of the article is either above or below the base when enclosed within the mold. When extruding downwardly and forming in an upside down article position, the flash attached to the neck is represented by a portion of the leading end of the parison being extruded whereas with the same direction in right side up forming, the flash is represented by a portion of the trailing end of the parison being extruded. The reverse is true when extrusion is in the upward direction.

Though the flash gripping portion of the apparatus of the invention has been illustrated as including jaws which close around the outer surface of the flash, it is obvious that other gripping means might be utilized. Such means might include a threaded rod for insertion into the flash through the open end of the parison a distance sufficient to engage the inner surface thereof especially along molded threads in the plastic. During cooling the polymer will shrink and firmly grip the outer surface of the rod, and the flash may then be removed by pulling the rod with the plastic impaled thereon away from the neck. The tapered forming mandrel would of course then be inserted into the neck to smooth the inner surface in the manner previously described. The preferred gripping means, however, include jaws closing on the outer surface of the flash, especially when blowing systems of the type illustrated in FIG. 8 are used wherein the portion of the parison adjacent the neck of the article is sealed shut during closing movement of the mold sections.

Though the neck portion of the article of the present invention has been illustrated with threads (90 in FIG. 5) formed on its outer surface for cooperating with those on a closure, other forms of closure cooperating projections molded by means of appropriate conforming cavities in the neck defining portion of the mold may be used. For example, in addition to those necessary to accommodate a threaded closure, lugs or rings for accepting a roll on or crown closure or any combination of these on a single neck are considered to be within the purview of the present invention. Also, in certain situations, it may not be necessary to employ any closure mating projections at all on the outer surface of the neck, for example, when the neck of the article is to remain open or is to accept a closure sealing on the inner surface of the finished neck.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. Apparatus for forming a hollow plastic article having a finished neck which comprises:

a. blow mold means comprising partible sections which in the closed position form an article shape-defining cavity, said blow mold means having an inwardly directed step at the end of a neck-defining portion of said cavity;

b. a neck flash holding cavity adjacent the neck-defining portion of said article shape-defining cavity;

c. means for expanding a thermoplastic parison within said article shape-defining cavity to form said article;

d. means downstream of said blow mold means for gripping neck flash;

e. means for displacing said gripping means and article with respect to each other to sever the neck flash from the article at the thermoplastic portion formed opposite said step;

f. a forming mandrel downstream of said blow mold means for entry into said neck after removal of the neck flash to finish form said thermoplastic portion;

g. means for moving said mandrel into said neck such that the leading end thereof proceeds beyond said thermoplastic portion and thereafter out of said neck; and h. means for supporting the neck of the article during said finish forming.

2. The apparatus of claim 1 wherein the partible sections have opposing compression edges at the upper and lower ends thereof for sealing each end of the parison shut on closing said sections.

3. The apparatus of claim 1 wherein the gripping means includes a pair of opposing jaws which in the closed position form a chamber substantially conforming in surface contour to that of said neck flash, each of said jaws having a groove formed in its surface for accepting a portion of said neck flash on closing thereon.

4. The apparatus of claim 1 wherein said step projects inwardly toward the axis of the mold cavity a distance of between 0.05 to 0.125 inch.

5. The apparatus of claim 1 wherein the shape of the cavity defining the article includes a cylindrical portion having a diameter substantially equivalent to that of the neck defining portion of the cavity.

6. The apparatus of claim 1 wherein the means for expanding the parison includes a hollow needle in a bore in one of said sections opening into the neck flash holding section of the mold.

* * * * *